United States Patent Office 3,447,765
Patented June 3, 1969

3,447,765
AUTOMATIC CONTROL SYSTEM FOR LANDING AN AIRCRAFT
Jerry Doniger, Montvale, Ervin Schoenblum, Elizabeth, and Martin W. Feintuch, Jersey City, N.J., assignors to The Bendix Corporation, Teterboro, N.J., a corporation of Delaware
Filed May 27, 1965, Ser. No. 459,245
Int. Cl. B64c 13/00, 15/00
U.S. Cl. 244—77               18 Claims

ABSTRACT OF THE DISCLOSURE

A system for landing an aircraft provides altitude displacement signals, commanded rate of descent signals and actual rate of descent signals which are combined and summed with a command signal. The summation signal is integrated and added to the combined signal to provide a control signal which is limited and used to control the aircraft during landing.

---

This invention relates to an aircraft control system and more particularly to a system for landing an aircraft.

A basic problem presented in landing an aircraft is to guide the aircraft to approach the runway asymptotically to intercept the runway at a small angle thus preventing the aircraft from violently contacting the runway and experiencing considerable impact at touch down. The necessity for asymptotic approach and the elimination of violent impact is evident when safety factors as well as wear and tear on aircraft components are considered.

An aircraft following a glide slope beam approaches the runway in a straight line flight path. In order to provide for the aforenoted asymptotic approach, the straight line path must be "flared" just prior to landing. In order to accomplish this necessary modification in the flight path, a novel flare computer constructed according to the present invention may be employed to control the aircraft during the landing maneuver.

An automatic system which provides the necessary flare of the straight line flight path may employ a control signal derived as a function of the difference between a command condition signal and an actual condition signal. This control signal is utilized in controlling a flight parameter, such as rate of descent, which varies with the required deviation from the straight line flight path.

Generally, the operation of the flare computer embodied in the present invention accomplishes the above noted task by using condition signals to provide a pitch command signal to control the pitch attitude of the aircraft in the landing mode. The condition signals may include actual altitude rate and command altitude rate of the aircraft. The control signal is the difference between the actual and command altitude rates of the aircraft, and provides a pitch command signal which is utilized to control the pitch attitude of the aircraft below a predetermined altitude to guide the aircraft to approach the ground asymptotically.

The actual rate of descent signal may be derived from an altitude displacement signal provided by a radio altimeter which will be effected by the terrain over which the aircraft is flying. In order to minimize these effects, the radio altitude displacement signal employed in the present invention is mixed, through appropriate filters, with a normal accelerometer signal to provide a reasonably noise free, instantaneous signal corresponding to the actual rate of descent of the aircraft.

The altitude displacement signal, a commanded rate of descent signal, and the actual rate of descent signal are summed and the summation signal is passed through an unsymmetrical limiter to the automatic pilot and/or flight director system to prevent undesirable nose-down attitude and limit nose-up attitude of the aircraft. The unsymmetrical limiter eliminates nose-down signals and limits nose-up signals to reasonable amplitudes. The integral of the summation signal also may be used to control the aircraft and/or flight director.

One object of the present invention is to guide an aircraft to approach a runway asymptotically during the landing maneuver.

Another object of the invention is to provide a flare computer to control the aircraft during the landing mode.

Another object of the invention is to utilize actual and commanded rate of descent signals to control an automatic pilot or flight director during the landing maneuver.

Another object of the invention is to compute landing and control data and transmit this data to aircraft control means.

Another object of this invention is to control the rate of descent of an aircraft so that the aircraft approaches the ground asymptotically.

Another object of this invention is to convert a reasonably noise free instantaneous signal corresponding to rate of descent of the aircraft to a pitch command signal to which the aircraft will respond during the landing maneuver.

Another object of this invention is to unsymmetrically limit pitch command signals for controlling the aircraft during the landing mode to eliminate nosedown commands and limit the amplitude of nose-up commands.

Another object of this invention is to program the rate of descent during landing continuously as a linear function of altitude.

Another object of this invention is to integrate an altitude rate signal during the flare maneuver to provide a pitch command signal and to synchronize the altitude rate signal during non-flare operation to eliminate flare engage transients.

Another object of this invention is to provide flare signals during the landing mode for controlling an automatic pilot and/or flight director system.

These and other objects and features of the invention are pointed out in the following description in terms of the embodiment thereof which is shown in the accompanying drawings. It is to be understood, however, that the drawings are for the purpose of illustration only and are not a definition of the limits of the invention, reference being had to the appended claims for this purpose.

Figure 1:
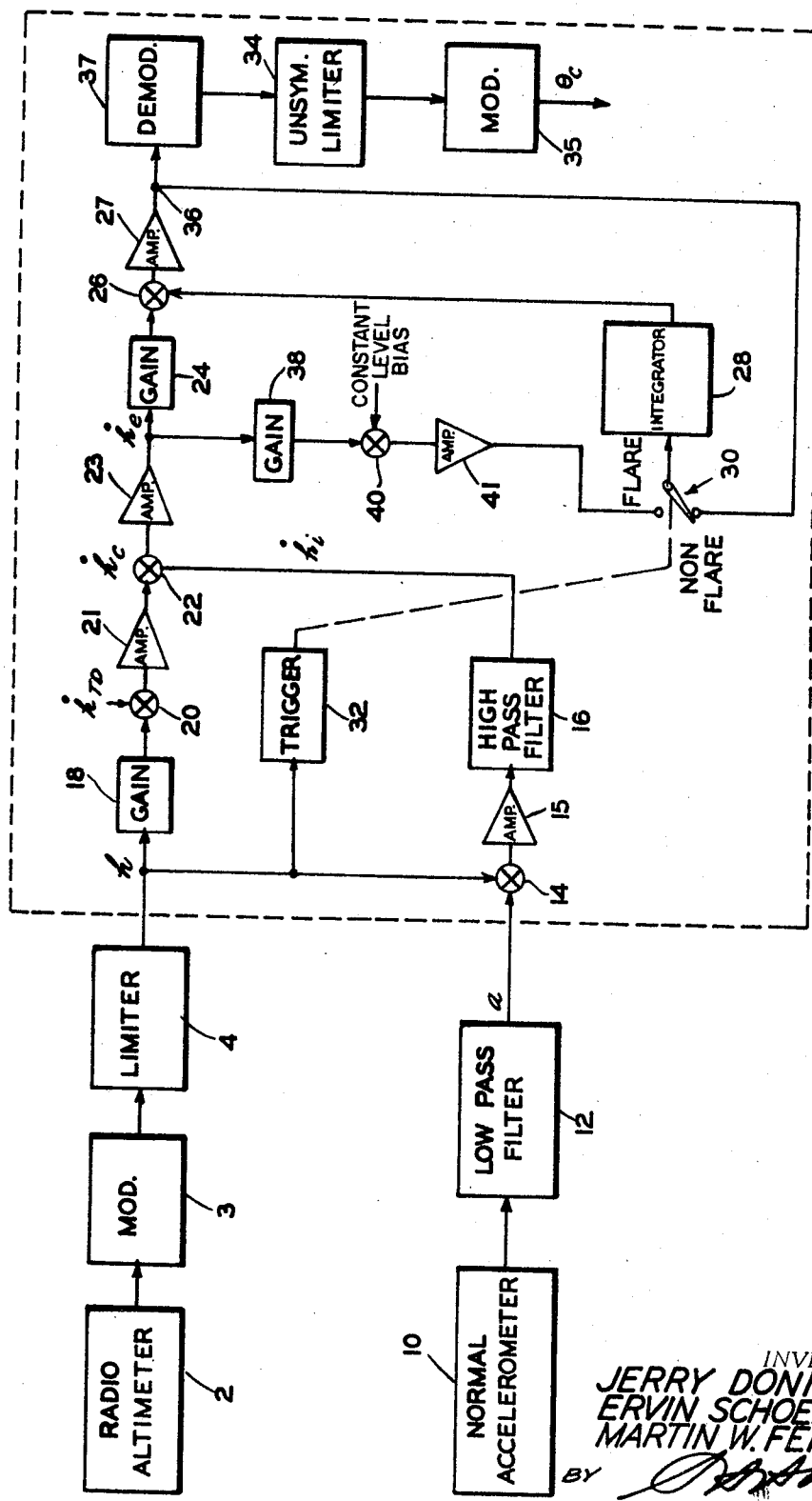
FIGURE 1 is a block diagram showing a novel flare computer together with appropriate signal sensors for providing a flare signal in accordance with the invention.

The actual altitude rate $\dot{h}_1$ of the aircraft, as shown in FIGURE 1, is derived from a direct current altitude displacement signal from radio altimeter 2. A modulator 3 modulates the direct current signal and the modulated signal is transmitted to a limiter 4 to limit the amplitude of the modulated signal to provide a modulated, limited altitude displacement signal $h$.

To minimize unwanted variations inherent in signal $h$ due to terrain variations, measuring lags and other noise sources, a normal acceleration signal derived from normal accelerometer 10 is coupled through a low pass filter 12 having lag characteristics, as will be hereinafter described, to provide a filtered acceleration signal $a$. Signal $h$ from the limiter 4 and signal $a$ from the low pass filter 12 are summed at a summation point 14 and the summation signal, which is amplified by an amplifier 15, is converted to the rate signal $\dot{h}_i$ by a high pass filter 16 having rate characteristics as will be hereinafter described. Rate signal $\dot{h}_i$ corresponds to the instantaneous vertical velocity of the aircraft.

Displacement signal $h$ is directed through a gain adjustment device 18 to a summation point 20 and summed with a command altitude rate signal at touch down, $\dot{h}_{TD}$, with the summation signal amplified by the amplifier 21 to provide a command altitude rate signal $\dot{h}_c$ which may be written algebraically as:

$$\dot{h}_c = Kh - 2K = \frac{\dot{h}_c + 2}{h} \quad (1)$$

In this equation, K is a gain factor derived from the gain adjustment device 18 and expressed in units of seconds$^{-1}$ to apply rate characteristics to the signal $h$. If the flare pattern is initiated at an altitude of 50 feet, for example, and the normal approach rate of descent is 10 feet per second then;

$$K = \frac{\dot{h}_c + 2}{h} \text{ or } \frac{10+2}{50} \text{ or } \frac{12}{50} \text{ seconds}^{-1} \text{ or } 4.1 \text{ seconds}$$

At touch down $h$ is equal to zero altitude and the command rate $\dot{h}_c$ is 2 feet/second.

The command altitude rate signal $\dot{h}_c$ is summed at summation point 22 with actual altitude rate signal $\dot{h}_i$, and the summation signal amplified by an amplifier 23 to provide an altitude rate error signal $\dot{h}_e$. The altitude rate error signal $\dot{h}_e$ is utilized to generate a pitch command signal to control the aircraft in the flare mode. The signal $\dot{h}_e$ is directed through a gain device 24 to a summation point 26 and through a gain device 38 to a summation point 40 where it is summed with a constant level biasing signal provided to generate nose-up pitch command signals during the flare mode of operation to compensate for ground effects as the aircraft nears the ground.

The summation signal at the point 40 is amplified by an amplifier 41 and coupled to an integrator 28. Integrator 28 is actuated by a switch 30 which responds through a trigger 32 to altitude displacement signal $h$ from radio altimeter 2. The operation of integrator 28 is such that during the flare mode it acts as an integrator to integrate the signal from amplifier 41 with this integrated signal being coupled to summation point 26. During the cruising mode integrator 28 acts as a synchronizer to provide a null signal at the point 36. The signal at summation point 26, amplified by the amplifier 27 and effected by the null signal at the point 36 as will be hereinafter explained, is demodulated by a demodulator 37 and limited by an unsymmetrical limiter 34 so that initial nose-down pitch commands are eliminated and nose-up commands are limited to amplitudes which may be reasonably required. The output of unsymmetrical limiter 34 represents a pitch command signal $\theta_c$ which, when modulated by a modulator 35 may be coupled to an automatic pilot or flight director system to control the aircraft during the landing mode.

Figure 2:
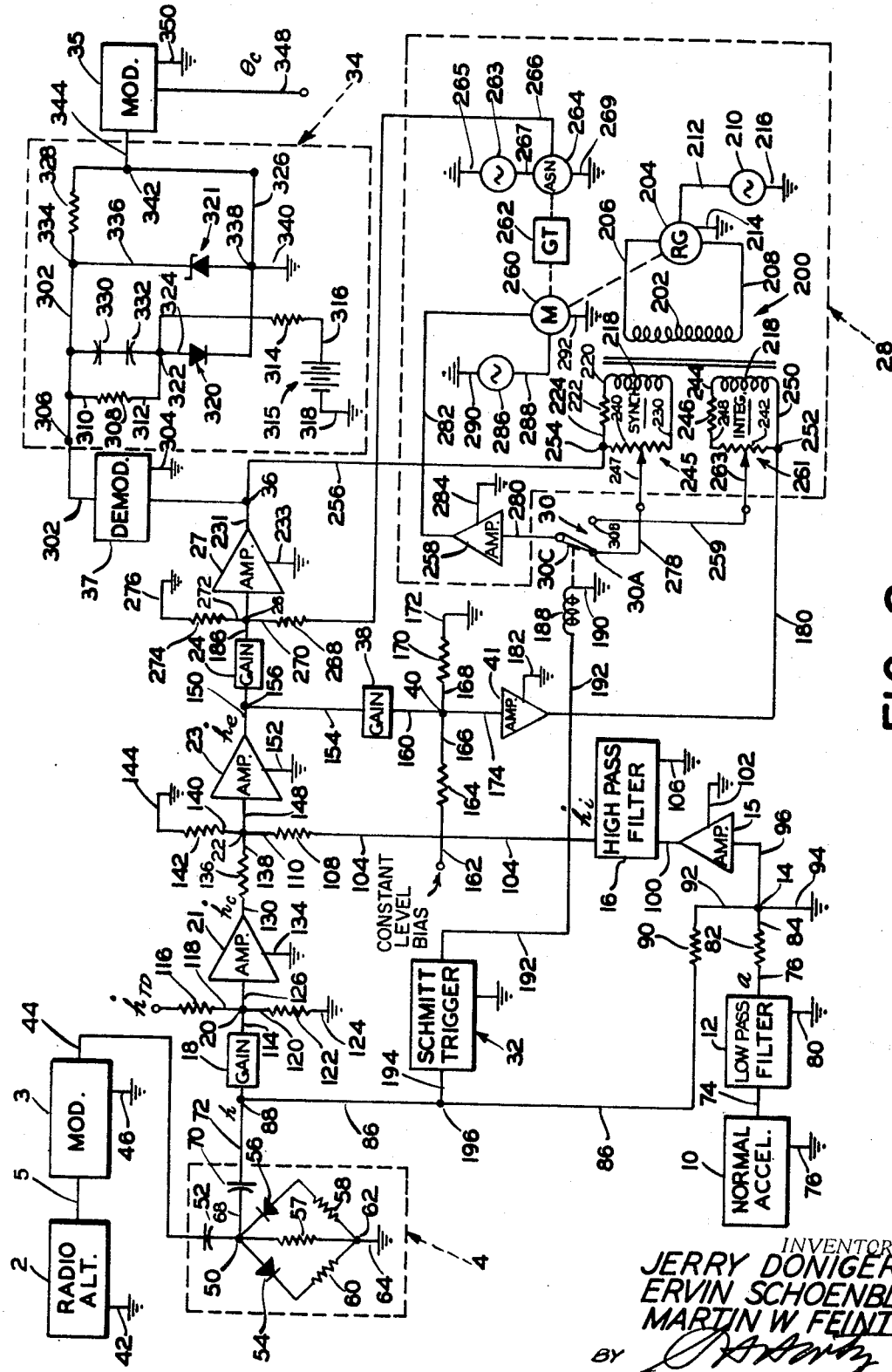
FIGURE 2 is a schematic diagram showing details of the circuits in the block diagram 1.

In reference to FIGURE 2, wherein corresponding elements shsown in FIGURE 1 are affixed with like numerals, an altitude displacement signal is generated by radio altimeter 2. This signal, taken across an output conductor 5 and a grounded output conductor 42, is coupled through the conductor 5 to modulator 3 having the purpose of providing the signal with appropriate alternating current characteristics. The output of modulator 3 is coupled to an input-output terminal 50 of limiter 4 through output conductor 44 and a grounded output conductor 46 to prevent excessive altitude displacement signals from being generated, and to thus limit the rate of descent of the aircraft.

The signal at terminal 50 acts to bias diodes 54 and 56 so that normally both diodes are reverse biased with the signal passing through diode 54, a resistor 60, a resistor 58, diode 56, and returning to point 50. When the input signal at point 50 reaches a specific limit, as determined by a resistor 57, diode 54 will remain reverse biased, but diode 56 will become forward biased with the result being that opposing signals will be generated at the point 50. Diodes 54 and 56 and resistors 57, 58 and 60, therefore, form a circuit grounded at a point 62 through a grounded conductor 64, which limits the signal derived from radio altimeter 2 to a predetermined value based on the characteristics of the resistors and the diodes. The output of limiter 4 representing a modulated, limited altitude displacement signal $h$, is coupled through a conductor 68 and a capacitor 70 to a conductor 72. An input capacitor 52 and output capacitor 70 are provided to remove excessive noise from the circuitry of limiter 4.

In order to compensate for terrain variations and other errors which would impair the accuracy of the flare computer being described herein, signal $h$ is mixed with a signal derived from normal accelerometer 10. The output of normal accelerometer 10, taken across an output conductor 74 and a grounded output conductor 76, is coupled through conductor 74 to filter 12, which provides an acceleration signal $a$ having lag characteristics. A signal taken across an output conductor 76 and a grounded output conductor 80 is coupled through conductor 76, a resistor 82 and a conductor 84 to summation point 14 where it is combined with signal $h$ coupled to summation point 14 through a conductor 86 joining output conductor 72 of limiter 4 at the point 88, a resistor 90 and a conductor 92.

The signal at summation point 14 is grounded by a conductor 94 and coupled through a conductor 96 to amplifier 15 which acts to amplify the summation signal at point 14. The output of amplifier 15 taken across an output conductor 100 and a grounded output conductor 102 is coupled through the output conductor 100 to high pass filter 16 which provides rate characteristics thereto. The signal at an output conductor 104 and a grounded output conductor 106 is the actual altitude rate signal $\dot{h}_i$.

The derivation of the actual altitude rate signal $\dot{h}_i$ may be shown algebraically by applying lag characteristics, $F_L$, and rate characteristics $F_R$ to altitude displacement signal $h$;

$$\dot{h}_i = (F_L + h)(F_R) \quad (2)$$

The expression for $F_L$ is supplied by lag filter 12 which provides appropriate gain ($K_n$) and lag $$\left( \frac{T_L}{T_L S + 1} \right)$$

characteristics to a signal A from normal accelerometer 10. The expression for $F_R$, provided by filter 16, may be represented as $$\frac{S}{T_R S + 1}$$

Substituting these characteristics in Equation 2;

$$\dot{h}_i = \left( \frac{A K_n T_L}{T_L S + 1} + h \right) \left( \frac{S}{T_R S + 1} \right) \quad (3)$$

Considering that the time constant $T_L$ is made very long with respect to $T_R$; on a long period basis $T_L S$ is made greater than one; and $A = S\dot{h}$; Equation 3 may be rewritten as:

$$\dot{h}_i = \dot{h}_s \left( \frac{K_n S + 1}{T_R S + 1} \right) \quad (4)$$

Equation 4, therefore, represents an expression for actual altitude rate signal $\dot{h}_i$ derived from altitude displacement signal $h$ and the characteristics of filters 12 and 16, and whereby it may be seen signal $\dot{h}_i$ is a linear function of signal $h$.

The actual altitude rate signal $\dot{h}_i$ is coupled through the output conductor 104 of the filter 16, a resistor 108 and a conductor 110 to summation point 22. Altitude displacement signal $h$ is coupled through the conductor 72, gain device 18 and a conductor 114 to the summation point 20. The actual altitude rate at touchdown, $\dot{h}_{TD}$ is combined with the altitude displacement signal $h$ at summation point 20 through a resistor 116 and a conductor 118. The combined signal is grounded through a conductor 120, a resistor 122 and a grounded conductor 124 and is simplified by amplifier 21 through a conductor 126. The output of the amplifier 21 taken across the output conductor 130 and a grounded conductor 134 thus represents command altitude rate $\dot{h}_c$. This signal is coupled through conductor 130, a resistor 136 and a conductor 138 to summation point 22 where it is combined with actual altitude rate signal $\dot{h}_i$. The signal at summation point 22 is referenced to ground through a conductor 140, a resistor 142 and a grounded conductor 144 and amplified by amplifier 23 through a conductor 148. The amplified signal taken across output conductors 150 and 152 of amplifier 23 represents altitude rate error signal $\dot{h}_e$. This signal is coupled to summation point 40, through a conductor 154 joining output 150 of amplifier 23 at a point 156, gain device 38 and a conductor 160. The constant level bias signal for generating a nose up command is combined with error signal $\dot{h}_e$ at summation point 40 through a conductor 162, a resistor 164 and a conductor 166 to provide a command to the system. The combined signal at point 40 is referenced to ground through a conductor 168, a resistor 170 and a grounded conductor 172 and amplified by amplifier 41 through conductor 174 to provide an output across a conductor 180 and a grounded conductor 182.

The altitude rate error signal $\dot{h}_e$ is directed to another summation point 26, through output conductor 150 of amplifier 23, gain adjustment device 24 and a conductor 186. Another input to the summation point 26 is the output of integrator 28 which will be generated and connected to summation point 26 in a manner to be hereinafter explained.

Integrator 28 is of the electro-mechanical type and serves a dual purpose, acting as a synchronizer in the non-flare mode of operation and as an integrator in the flare mode of operation. Under normal operating circumstances the non-flare mode of operation is engaged. This is accomplished by an arm 30C of a switch 30 making contact with a contact point 30A. The switch 30 is activated by a spring biased relay coil 188 having one terminal thereof referenced to ground through a conductor 190 and another terminal thereof operably connected through a conductor 192 to a triggering device 32 which may be a device such as a Schmitt trigger referenced on p. 432 of Electronics for Scientists, Malmstadt et al., W. A. Benjamin, Inc., New York, N.Y., 1963. The triggering device 32 acts so as to remain in a stable state as long as its input remains above a particular pre-selected level. As soon as the signal drops below this level there is a rapid transition with the result that input signals below the pre-selected level are discriminated against and provide no output signal. The triggering device 32 receives altitude reference signal $h$ through the output conductor 72 of limiter 4, the conductor 86 joining the conductor 72 at the point 88, and the conductor 86 further joining an input conductor 194 of triggering device 32 at a point 196. This signal will activate triggering device 32 to energize the relay coil 188 so as to actuate switch 30 to the flare position with arm 30C of switch 30 making contact with contact point 30B.

Switch 30 acts in cooperation with integrator 28 which includes a transformer 200. A primary winding 202 of transformer 200 is connected across a rate generator 204 by conductors 206 and 208. The rate generator 204 is driven by a suitable alternating current power supply 210 connected to the rate generator 204 through an output conductor 212 and a grounded conductor 214. The alternating current power supply is coupled to ground through a conductor 216. Primary winding 202 of the transformer 200 is inductively coupled to a secondary winding 218. One half of transformer 200 is included in the synchronizing portion of the integrator 28, and the other half of the transformer 200 is included in the integrating portion thereof as shown in FIGURE 2. Considering the synchronizing portion of the transformer 200, one leg of secondary winding 218 is connected to a resistor 240 through a conductor 230 and the other leg connected to resistor 240 through a conductor 220, a resistor 222 and a conductor 224. Similarly, the integrating portion of transformer 200 has one leg of secondary winding 218 connected to a resistor 242 through a conductor 244, a resistor 246 and a conductor 248. Another leg of secondary winding 218 is connected to the resistor 242 through a conductor 250.

Integrator 28 receives the output of amplifier 41, which amplifies the summation of the ramp bias signal and the altitude rate error signal $\dot{h}_e$, through the conductor 180 being coupled to an input terminal 252 of the integrating portion of integrator 28. When the device is operating in the non-flare mode, that is, when the integrator 28 acts as a synchronizer, an output may be taken from the point 254 of the synchronizing portion of the integrator 28 and directed to the point 36 through a conductor 256. Essentially then, integrator 28 is a closed loop device with a signal from rate generator 204 coupled through transformer 200, switch 30 and an amplifier 258. The output of amplifier 258 is directed to a motor 260 which in turn is coupled so as to drive rate generator 204. Motor 260 is also coupled through a suitable gear train 262 to an autosyn 264. The output of autosyn 264 is directed through a conductor 266, a resistor 268 and a conductor 270 to summation point 26 where it is combined with altitude rate error signal $\dot{h}_e$. The summation signal at point 26 is referenced to ground through a conductor 272, a resistor 274 and a conductor 276.

Under non-flare conditions trigger 32 will keep switch 30 spring biased to the non-flare position with a circuit being made through contact 30A and a conductor 278. Integrator 28 is thus acting as a synchronizer. The heretofore defined loop is closed by the arm 30C of the switch 30 making contact with the contact point 30A of the switch 30 and a conductor 280 leading to the amplifier 258. The output of the amplifier 258 taken across the output conductor 282 and a grounded conductor 284 is directed to motor 260 so as to provide control signals thereto. Motor 260 is energized by an alternating current power supply 286 coupled to motor 260 through a conductor 288 and referenced to ground through conductor 290. The motor 260 also is referenced to ground through a conductor 292 and coupled by a suitable mechanical means to rate generator 204. Rate generator 204 is coupled to transformer 200 so as to induce an output across secondary winding 218 of transformer 200 as heretofore noted. A potentiometer 245 including the resistor 240 and an arm 247 is included so as to be adjustable in order to provide an appropriate closed loop signal ratio. The signal so provided is coupled back through conductor 278, switch 30 and conductor 280 so as to be applied to amplifier 258 as heretofore described. An output of the synchronizing portion of integrator 28 is taken at the point 254 and coupled through the conductor 256 to the point 36. When integrator 28 operates as a synchronizer in this manner, its output voltage connected to the point 36, acts to null the input voltage to the unsymmetrical limiter 34 and thus eliminates flare engage transients which may act in degradation of the command signal $\theta_c$ to be developed. Autosyn 264 is energized from a suitable alternating current source 263 having reference to ground through a conductor 265 and connected to the autosyn 264 by the output conductor 267. Autosyn 264 is coupled to ground through a conductor 269.

At a particular altitude, triggering device 32 will actuate relay coil 188 so as to engage the flare mode of operation of the aircraft. Arm 30C of switch 30 will thus make contact with contact point 30B thereof. Under these conditions the integrating portion of integrator 28 will form a closed loop circuit with amplifier 258 through a conductor 259, switch 30 and conductor 280. A potentiometer 261, including the resistor 242 and an arm 263, performs the same function as heretofore described for potentiometer 245. When the flare mode of the aircraft is engaged and device 28 is acting as an integrator, the signal resulting from the integration of the constant level bias signal and the altitude rate error signal $\dot{h}_e$, is coupled directly to summation point 26 through output conductor 266 leading from autosyn 264 in a manner as has been heretofore described for the non-flare mode of operation. Integrator 28 therefore, acts to reduce the altitude rate error signal $\dot{h}_e$ to zero, and to generate a nose-up command signal from the constant level bias signal supplied as an input to integrator 28.

The signal at the summation point 26 is directed through amplifier 27 with the output of amplifier 27 taken across an output conductor 231 and a grounded output conductor 233, being coupled through conductor 231 to point 36 where it is nulled by the output of the integrator 28 when the integrator 28 acts as a synchronizer as previously shown. Prior to being connected to unsymmetrical limiter 34, the signal at the point 36 is demodulated by the demodulator 37. The output of demodulator 37 taken across an output conductor 302 and a grounded conductor 304 is coupled to an input terminal 306 of unsymmetrical limiter 34 through the conductor 302.

A resistor 308 is joined to the input terminal 306 of unsymmetrical limiter 34 through a conductor 310, and to the positive terminal of a direct current source 315 through a conductor 312, another resistor 314 and a conductor 316. The negative terminal of direct current source 315 is coupled to ground through a conductor 318. A diode 320 is arranged so that its anode is coupled to the point 322 through a conductor 324, and its cathode is coupled to the point 306 through conductors 326 and 302, and a resistor 328. Diode 320 is thus normally reverse biased. Capacitors 330 and 332 are arranged across conductors 302 and 312 so as to build up a positive direct current signal in opposition to the reverse biasing of diode 320 so that when a predetermined voltage build-up so occurs, no voltage will pass through diode 320. A Zener diode 321, included to provide the appropriate voltage limit to the circuit, has a cathode coupled to the conductor 302 at a point 334 through a conductor 336, and its anode joins the conductor 326 at a point 338, with the point 338 coupled to ground by a conductor 340. The elements of unsymmetrical limiter 34 so arranged will operate so that initial nose-down pitch commands will not be transmitted to the autopilot because of the limitations provided by the diode 320. The nose-up command is limited by the Zener diode 321 so that only the necessary correction is provided at touch down.

The output of unsymmetrical limiter 34, taken at output terminal 342 thereof, is coupled through output conductor 344 to modulator 35 which may be of a conventional type similar to the modulator 3. The output of modulator 35 taken across output conductor 348 and grounded output conductor 350 is pitch command signal $\theta_c$ which may be utilized to provide the required aircraft control.

Figure 3:
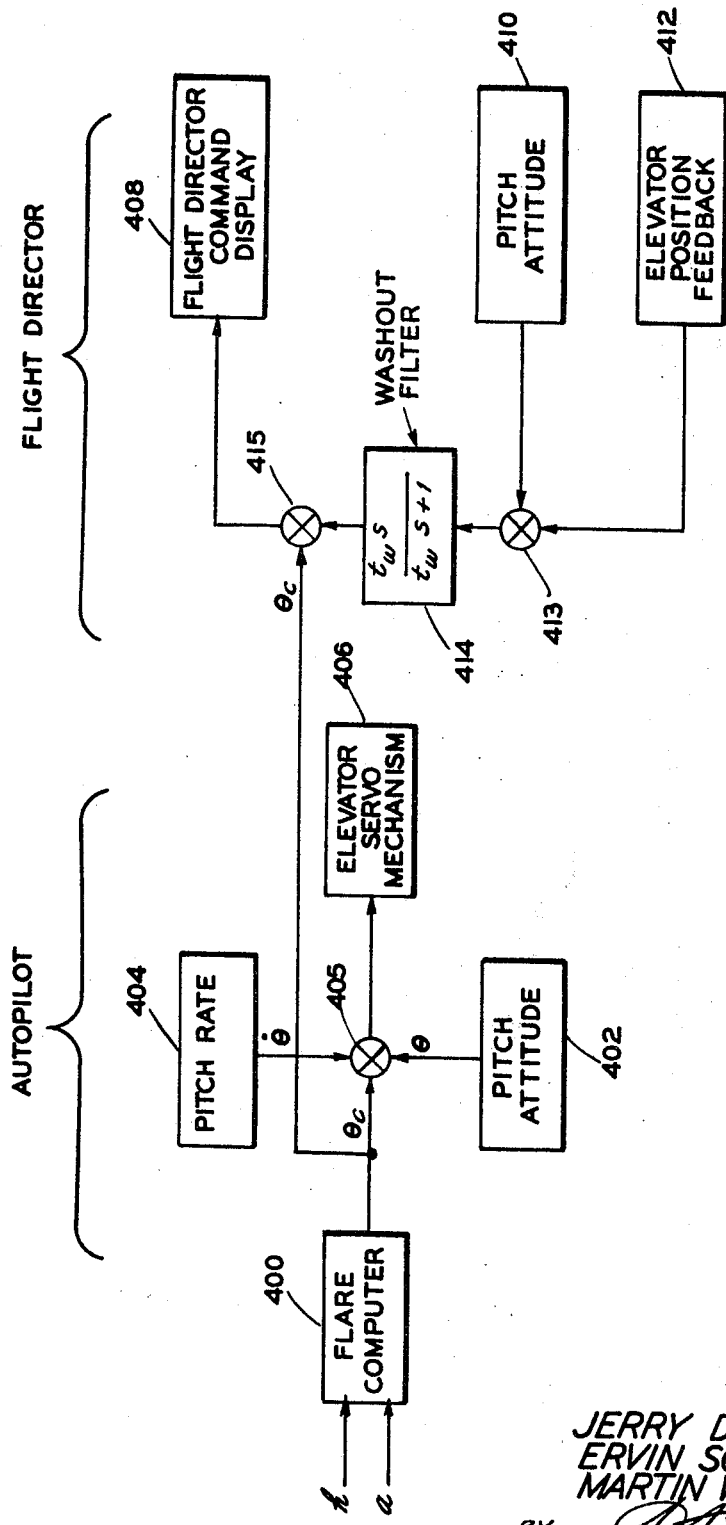
FIGURE 3 is a block diagram showing a control system for an aircraft including a novel flare computer constructed according to the invention.

The flare comptuer described generally in FIGURE 1 and in detail in FIGURE 2 is designated by the numeral 400 in FIGURE 3. The automatic pilot system used with the flare computer 400 may be a system which will provide a conventional pitch attitude signal 402 using a pitch rate parameter 404 for short period damping. The summation of pitch command signal $\theta_c$ a pitch attitude signal $\theta$, and a rate signal $\dot{\theta}$, at the point 405 in FIGURE 3, provides the necessary signal to servo mechanism 406 which may control, for example, the elevators of the aircraft.

In this manner the signal derived by the flare computer shown in FIGURES 1 and 2 may be converted to provide actual control of the aircraft during the landing mode.

Flare compute 400 may also be used with a flight director command display system 408. When so used, however, the input signal to flight director command display system 408 will also include a conventional pitch attitude signal 410, such pitch attitude signal 402 used with the automatic pilot system, and an elevator position feedback signal 412. Elevator position feedback signal 412 produces a phase advance and allows higher flare gain parameters to be used without forcing an instability on the system. The utilization of the elevator position feedback parameter in this manner provides more consistency during the manual flare maneuver and, hence, allows the flight director system to be relatively independent of the different pilots who may be so performing this maneuver.

Pitch attitude signal 410 and elevator feedback signal 412 are summed at a point 413 in FIGURE 3 with the resulting signal being directed to a wash-out filter 414. The necessity for the wash-out filter 414 is evident when it is considered that during the flare maneuver a tight attitude loop is desirable to prevent large dispersions in pitch attitude at touch down. Elevator position feedback signal 412 and pitch attitude signal 410 are applied to wash-out filter 414 prior to the flare maneuver in order to eliminate any transient signals which may result when the elevator position is not properly trimmed to null. Pitch command signal $\theta_c$ is thus mixed with the signal generated through wash-out filter 414 at point 415 and directed to the flight director command display 408 as shown in FIGURE 3.

The operation of the flare computer embodied in the present invention may be best summarized by emphasizing some of the distinguishing features of the device.

Essentially, the flare computer operates by utilizing radio attitude displacement and normal acceleration signals provided by radio altimeter 2 and the normal accelerometer 10 shown in FIGURES 1 and 2. These signals when properly filtered by filters 12 and 16 provide a useful noise free rate of descent signal $\dot{h}_1$ which may be utilized to develop an altitude rate error signal designated as $\dot{h}_e$.

Altitude rate error signal $\dot{h}_e$ may be processed to develop pitch command signal $\theta_c$ to control the aircraft during the flare maneuver either by coupling the pitch command signal to an automatic pilot system, or by coupling it to an indicating device of a flight director system whereby manual control may be accomplished. Of importance in the processing procedure of the pitch command signal $\theta_c$ is integrator 28 shown in FIGURES 1 and 2. A distinguishing feature of integrator 28 is that it is operable as a synchronizer prior to flare engagement and thus functions to eliminate flare engage transients. After flare engagement, integrator 28 functions as an integrator and is operable to reduce the latitude rate error signal $\dot{h}_e$ to zero, and to generate a nose-up altitude rate command signal from the constant level bias signal at the input of integrator 28.

In order to provide appropriate limitations on pitch command signal $\theta_c$, this signal is directed through unsymmetrical limiter 34. Unsymmetrical limiter 34 prevents nose-down commands from being transmitted to the autopilot or flight director systems, and limits the nose-up commands to amplitudes required for the proper flare out pattern.

The application of pitch command signal $\theta_c$ to flight director system 408 shown in FIGURE 3 is distinguished by the use of an elevator position feedback signal indicated by the numeral 412 in FIGURE 3, in addition to the conventional pitch command and altitude reference signals for flight director operation.

The landing system as described with reference to FIGURES 1, 2 and 3 included herein can be of extreme importance in the daily operations of modern aircraft. This importance is emphasized when it is considered that the present system will significantly reduce the affect of weather conditions on aircraft landing, and tend to accrue savings on items which would normally be subject to wear and tear due to non-precision landings.

Although only one embodiment of the invention has been illustrated and described, various changes in the form and relative arrangements of the parts, which will now appear to those skilled in the art may be made without departing from the scope of the invention. Reference is, therefore, to be had to the appended claims for a definition of the limits of the invention.

What is claimed is:

1. A system for landing an aircraft comprising means for providing displacement signals corresponding to an aircraft altitude, means for providing signals corresponding to a command rate of descent of the aircraft at a predetermined altitude, means for providing signals corresponding to the actual rate of descent, means for combining said displacement signals, command signals and actual rate of descent signals of the aircraft to provide a combined signal as a linear function of altitude, means for providing a constant nose up command signal, means for combining the nose up command and combined signals to provide a summation signal, integrating means for integrating the summation signal to provide an integration signal, means responsive to the combined signal and the integration signal to provide a control signal, unsymmetrical limiting means for limiting the control signal, and means responsive to the limited control signal to control the aircraft about the pitch axis during the landing maneuver.

2. A system for landing an aircraft comprising means for providing displacement signals corresponding to an aircraft altitude, means for providing signals corresponding to a commanded rate of descent of the aircraft at a predetermined altitude, means for providing signals corresponding to the actual rate of descent, means for combining said displacement, command and actual rate of descent signals of the aircraft to provide a combined signal as a linear function of altitude, means for providing a signal for generating a constant nose up command, means for combining said constant nose up command signal and the combined signal to provide a summation signal, means for integrating the summation signal to provide an integration signal, means responsive to the combined signal and the integration signal to provide a control signal, limiting means for limiting the control signal and means responsive to the limited control signal to control the aircraft about the pitch axis during the landing maneuver.

3. A system for landing an aircraft comprising means providing displacement signals corresponding to an aircraft altitude, means for providing signals corresponding to a commanded condition of the aircraft at a predetermined altitude, means for providing signals corresponding to an actual condition, means for combining said displacement command and actual condition signals to provide a combined signal as a linear function of altitude, means for providing a bias signal for generating a constant nose up command, means for combining the bias and combined signals to provide a summation signal, integrating means for integrating the summation signal to provide an integration signal, means responsive to the combined signal and the integration signal to provide a control signal, unsymmetrical limiting means for limiting the control signal, and means responsive to the limited control signal to control the aircraft about the pitch axis during the landing maneuver.

4. A computer for computing a control signal for landing an aircraft from displacement signals corresponding to aircraft altitude, signals corresponding to a commanded rate of descent at a predetermined altitude and signals corresponding to the actual rate of descent, comprising means for combining said signals to provide a combined signal as a linear function of altitude, means for receiving a constant nose up command signal, means for combining the nose up command and combined signals to provide a summation signal, synchronizing means for providing a null signal to eliminate transient signals prior to engagement of said computer, integrating means for integrating the summation signal to provide an integration signal after engagement of said computer, means responsive to the combined signal and the integration signal to provide a control signal, and an unsymmetrical limiter for limiting the control signal to eliminate nose-down commands and to adjust the amplitude of nose-up commands.

5. An automatic system for landing an aircraft comprising means for providing displacement signals corresponding to an aircraft altitude, means for providing signals corresponding to a commanded rate of descent of the aircraft at a predetermined altitude, means for providing signals corresponding to an actual rate of descent of the aircraft, means for combining said displacement signals, command signals, and actual rate of descent signals to provide a combined signal as a linear function of altitude, means for providing a signal for generating a constant nose up command, means for combining said signal and the combined signal to provide a summation signal, integrating means for integrating the summation signal to provide an integration signal, means responsive to the combined signal and the integration signal to provide a control signal, unsymmetrical limiting means for limiting the control signal, and means responsive to the limited control signal to control the aircraft about the pitch axis during the landing maneuver.

6. An automatic system for landing an aircraft comprising sensors for providing displacement signals corresponding to an aircraft altitude, means for providing signals corresponding to a commanded rate of descent of the aircraft at a predetermined altitude, means for providing signals corresponding to the actual rate of descent, circuitry for combining said signals to provide a combined signal as a linear function of altitude, means for providing a signal for generating a constant nose up command, circuitry for combining the combined signal and the nose-up command signal to provide a summation signal, an integrator for integrating the summation signal to provide an integration signal, means responsive to the combined signal and the integration signal to provide a control signal, unsymmetrical limiting means for limiting the control signal, and means responsive to the limited control signal to control the aircraft about the pitch axis during the landing maneuver.

7. A system for landing an aircraft comprising means for providing signals corresponding to an altitude displacement of the aircraft, means for providing signals corresponding to a commanded rate of descent of the aircraft at a predetermined altitude, means for providing signals corresponding to the actual rate of descent, means for combining said signals to provide a combined signal as a linear function of altitude, means for providing a constant nose-up command signal, means for combining the nose-up command and combined signals to produce a summation signal, integrating means for integrating the summation signal to provide an integration signal, means responsive to the combined signal and integration signal to provide a control signal, limiting means to limit the control signal, and an automatic pilot system responsive to the limited control signal so as to provide the aircraft with a preselected pitch attitude during a landing maneuver.

8. A system for landing an aircraft comprising means for providing signals corresponding to an altitude displacement of the aircraft, means for providing signals corresponding to a commanded rate of descent of the aircraft at a predetermined altitude, means for providing signals corresponding to the actual rate of descent, means for combining said displacement signals, command signals and actual rate of descent signals to provide a combined signal as a linear function of altitude, means for providing a constant nose-up command signal, means for combining the nose-up command and combined signals to provide a summation signal, integrating means for integrating the summation signal to provide an integration signal, means responsive to the combined signal and integration signal to provide a control signal, means for limiting the control signal, and means responsive to the limited control signal to provide data for manually guiding the aircraft about the pitch axis during the landing mode.

9. A system for landing an aircraft comprising means for providing signals corresponding to an altitude displacement of the aircraft, means for providing signals corresponding to a commanded rate of descent of the aircraft at a predetermined altitude, means for providing signals corresponding to the actual rate of descent, means for combining said signals to provide a combined signal as a linear function of altitude, means for providing a signal for generating a constant nose-up command signal, means for combining said last mentioned signal and the combined signal to provide a summation signal, integrating means for integrating the summation signal to provide an integrated signal, means for receiving said combined and integrated signals to provide a control signal, means to limit the control signal, and means responsive to the limited control signal for controlling the aircraft about the pitch axis during the landing maneuver.

10. A system for landing an aircraft comprising means for providing altitude displacement signals, means for providing commanded rate of descent signals at a predetermined altitude, means for providing actual rate of descent signals, means for combining said signals to provide a combined signal as a linear function of altitude, means for providing a constant nose-up command signal, means for combining said command and combined signals to provide a summation signal, means for integrating the summation signal to provide an integrated signal, means for combining said combined and integration signals to provide a control signal, means to limit said control signal, and means to receive said limited control signal to control the aircraft about the pitch axis during the landing maneuver.

11. A device for providing control signals used in landing an aircraft comprising means for providing displacement signals corresponding to an aircraft altitude, means for providing signals corresponding to a commanded rate of descent of the aircraft at a predetermined altitude, means for providing signals corresponding to the actual rate of descent of the aircraft, means for combining said signals to provide a combined signal as a linear function of altitude, means for providing a signal for generating a constant nose-up command, means for combining said last mentioned signal and the combined signal to provide a summation signal, means responsive to the summation signal to provide an integrated signal, means for receiving said combined and integrated signals to provide a control signal, an unsymmetrical limiter to limit the control signal, and means responsive to the limited control signal for controlling the aircraft about the pitch axis during the landing maneuver.

12. A computer for computing a control signal for landing an aircraft from altitude displacement signal, commanded rate of descent signals at a predetermined altitude and actual rate of descent signals, comprising means for combining said signals to provide a combined signal as a linear function of altitude, means for receiving a signal to generate a command, means for combining said last mentioned signal and the combined signal to provide a summation signal, means for integrating the summation signal to provide an integration signal, and unsymmetrical limiting means for limiting said control signal.

13. A device for landing an aircraft used in combination with an automatic flight control system, comprising means for providing displacement signals corresponding to an aircraft altitude, means for providing signals corresponding to an actual rate of descent of the aircraft, means for providing signals corresponding to commanded rate of descent at a predetermined altitude, means for combining said signals to provide a combined signal as a linear function of altitude, means for providing a signal for generating a constant nose-up command, means for combining said last mentioned signal and the combined signal to provide a summation signal, means for integrating the summation signal to provide an integration signal, means for receiving the combined signal and the integration signal to provide a control signal, means for limiting the control signal, and the automatic flight control system responsive to the limited control signal for controlling the aircraft about the pitch axis during the landing maneuver.

14. A system for landing an aircraft comprising means for providing signals corresponding to an altitude displacement of the aircraft, means for providing signals corresponding to a command rate of descent of the aircraft at a predetermined altitude, means for providing signals corresponding to the actual rate of descent, means for combining said displacement, commanded rate of descent and actual rate of descent signals to provide a combined signal as a linear function of altitude, means for providing a constant nose-up command signal, means for combining the nose-up command and combined signals to provide a summation signal, integrating means for integrating the summation signal to provide an integration signal, means responsive to the combined signal and the integration signal to provide a control signal, unsymmetrical limiting means for limiting the control signal to eliminate nose-down commands and to adjust the amplitude of nose-up commands, and means responsive to the limited control signal for controlling the aircraft about the pitch axis during a landing maneuver.

15. A system for landing an aircraft comprising means for providing displacement signals corresponding to an aircraft altitude, a modifier to modify the signals, a limiter to limit said modified signals, means for sensing acceleration signals, a filter for providing lag characteristics to the acceleration signals, means to combine said modified, limited altitude displacement signals and said filtered acceleration signals to provide resultant signals, a filter for filtering said resultant signals to provide signals corresponding to an actual rate of descent of the aircraft, means to provide signals corresponding to a commanded rate of descent of the aircraft at a predetermined altitude, means to combine said modified, limited displacement signals, actual rate of descent signals and said commanded rate of descent signals to provide a combined signal as a linear function of altitude, means for providing a constant nose-up command signal, means for combining the nose-up command and combined signals to provide a summation signal, means for synchronizing the summation signal during the cruising mode of flight to provide a null signal effective to eliminate transient signals from said combined signal, means for integrating the summation signal during the flare mode of flight to provide an integration signal, means responsive to the combined signal and the integration signal to provide a control signal, a demodulator for demodulating said control signal, unsymmetrical limiting means for limiting said control signal, and means responsive to said limited, modulated control signal to control the aircraft about the pitch axis during the landing maneuver.

16. A system for landing an aircraft comprising means for providing signals corresponding to an altitude displacement of the aircraft, means for providing signals corresponding to a commanded rate of descent of the aircraft at a predetermined altitude, means for providing signals corresponding to the actual rate of descent, means to combine said signals to provide a combined signal as a linear function of altitude, means for providing a constant nose-up command signal, means to combine said nose-up command and combined signals to provide a summation signal, integrating means for integrating the summation signal to provide an integration signal, means responsive to the combined and integration signals to provide a control signal, means to limit the control signal, means for providing an aircraft elevator position feedback signal, means to combine said control signal and said feedback signal to provide a signal having increased stability, and flight director means responsive to said last mentioned signal to provide data for manually guiding the aircraft about the pitch axis during the landing mode.

17. A system for landing an aircraft comprising means for providing altitude displacement signals, means for providing normal acceleration signals, means to combine said signals to provide an actual altitude rate signal, means for providing signals corresponding to a commanded altitude rate of the aircraft at a predetermined altitude, means for combining said displacement, actual altitude rate and command altitude rate signals to provide a combined signal as a linear function of altitude, means for providing a signal for generating a constant nose-up command, means for combining the nose-up command and combined signals to provide a summation signal, integrating means for integrating the summation signal to provide an integration signal, means responsive to the combined signal and the integration signal to provide a control signal, unsymmetrical limiting means for limiting the nose-up commands and eliminating the nose-down commands of the control signal, and means responsive to the limited control signal during a landing maneuver.

18. Means for controlling the descent of an aircraft from a predetermined altitude to zero altitude, comprising:

means for developing a first signal proportional to the instantaneous descent rate of said aircraft;

means for developing a second signal proportional to a predetermined commanded descent rate as a function of the instantaneous aircraft altitude, said first and second signals being oppositely sensed;

first signal mixing means receiving said first and second signals and developing an output proportional to the algebraic difference between said signals;

signal translating means receiving the output of said mixing means, said signal translating means being adapted to produce an output proportional to those input signals thereto having a sense like that of said first signal and rejecting a predetermined range of of input signals thereto having a sense opposite that of said first signal; and control means receiving the ouput of said translating means and being effective to control the rate of descent of said aircraft in response to the output of said signal translating means.

References Cited

UNITED STATES PATENTS 2,830,291  4/1958  Hecht et al. _____ 244—77 X

FERGUS S. MIDDLETON, *Primary Examiner.*

U.S. Cl. X.R.

235—250.22